Figure 1:
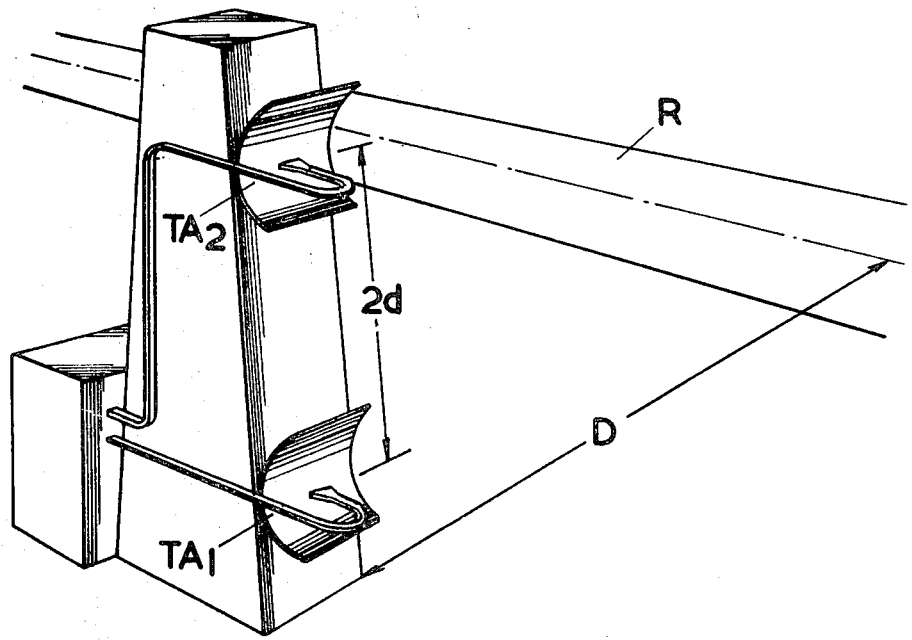

United States Patent
Benjamin et al.

[15] 3,648,288
[45] Mar. 7, 1972

[54] AIRCRAFT LANDING RADIO GUIDANCE RECEIVERS

[72] Inventors: John Benjamin, Farnborough; John Michael Jones, Hindhead, both of England

[73] Assignee: Minister of Technology in Her Britannic Majesty's Government of the United Kingdom of Great Britain and Northern Ireland, London, England

[22] Filed: May 19, 1970

[21] Appl. No.: 38,830

[30] Foreign Application Priority Data

May 20, 1969 Great Britain......................25,695/69

[52] U.S. Cl. ..........................................343/108 R, 343/107
[51] Int. Cl...........................................................G01s 1/02
[58] Field of Search............................................343/108, 107

[56] References Cited

UNITED STATES PATENTS

| | | | |
|---|---|---|---|
| 2,416,342 | 2/1947 | Newhouse............................ | 343/108 R |
| 3,404,402 | 10/1968 | Benjamin et al. ................... | 343/108 R |

*Primary Examiner*—Rodney D. Bennett, Jr.
*Assistant Examiner*—Richard E. Berger
*Attorney*—Cushman, Darby & Cushman

[57] ABSTRACT

Transmitter apparatus for glide path guidance includes two aerials spaced apart (preferably so that the perpendicular bisector of a line joining the aerials is parallel to the desired glide path) and means for feeling them with distinct but related frequency-modulated waveforms so as to yield at least two distinguishable cross-correlation products whose relative amplitudes will vary differentially with displacements from the desired glide path.

One aerial may be fed with a first carrier frequency modulated with a first modulation signal and the other aerial with a second carrier frequency modulated with second and third modulation signals, the second modulation signal being a frequency modulated waveform amplitude-modulated at 90 Hz., the first modulation signal being the said frequency-modulated waveform delayed by a time delay $t_o$, and the third modulation signal being the said frequency-modulated waveform delayed by a time delay $2t_o$ and amplitude-modulated at 150 Hz. A monitor receiver has inputs connected to inputs mounted on reflectors of the two aerials.

8 Claims, 7 Drawing Figures

Patented March 7, 1972

3,648,288

3 Sheets-Sheet 1

JOHN BENJAMIN
JOHN MICHAEL JONES
Inventors

By CUSHMAN, DARBY
& CUSHMAN
Attorneys

JOHN BENJAMIN
JOHN MICHAEL JONES
Inventors

By CUSHMAN, DARBY
& CUSHMAN
Attorneys.

AIRCRAFT LANDING RADIO GUIDANCE RECEIVERS

The present invention relates to aircraft landing radio guidance systems wherein the transmitted guidance signals are so modulated that in a suitable receiver they yield distinguishable cross-correlation products whose relative amplitudes will vary as the receiver is moved from one side to the other of the desired guidance path.

U.S. Pat. No. 3,404,402 describes and claims such systems and in particular describes embodiments for use in the localizer parts of instrument landing systems, commonly known as ILS systems. The present invention represents an improvement over those embodiments and will hereinafter be exemplified by a description of a preferred form for the glide path guidance parts of an ILS system.

In the aforesaid U.S. Pat. No. 3,404,402 modulation signals of many different forms were envisaged, including for instance pulses of suitable shapes or thermal noise signals. According to the present invention, transmitter apparatus for an instrument landing system includes two spaced-apart aerials and means for feeding to the aerials signals which are modulated with distinct but related frequency-modulated waveforms, so that when the said signals are propagated from the two aerials, on reception they will yield at least two distinguishable cross-correlation products which are equal in amplitude at points of reception on a desired guidance path and vary differentially in amplitude as the point of reception moves from one side to the other of the desired guidance path.

It has been found that the transmission bandwidth required to achieve a desired guidance accuracy and a desired immunity to reflection errors may be smaller when the modulation signals forming the cross-correlation products are frequency-modulated waveforms than the transmission bandwidth required to achieve similar accuracy and immunity with other suggested forms of modulation. Furthermore the use of frequency-modulated waveforms increases the overall efficiency of the system, in that it makes the useful received signal power at a given point equal to a greater proportion of the total power consumption of the transmitter apparatus.

The apparatus may include means for feeding to the first aerial a first carrier signal modulated with a first modulation signal and means for feeding to the second aerial a second carrier signal modulated with a second modulation signal and a third modulation signal, of which the second modulation signal is a frequency-modulated waveform amplitude-modulated by a first predetermined audiofrequency, the first modulation signal is the said frequency-modulated waveform delayed by a first predetermined time delay, and the third modulation signal is the said frequency-modulated waveform delayed by a second predetermined time delay and amplitude-modulated by a second predetermined audiofrequency.

The carrier frequencies are preferably chosen so that the difference between them lies in the range from 328 MHz to 335 MHz. For glide path guidance, microwave carrier frequencies are preferred.

Figure 2:
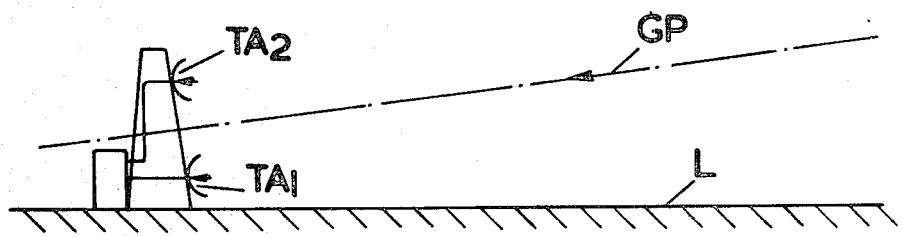
Figures 3, 4:
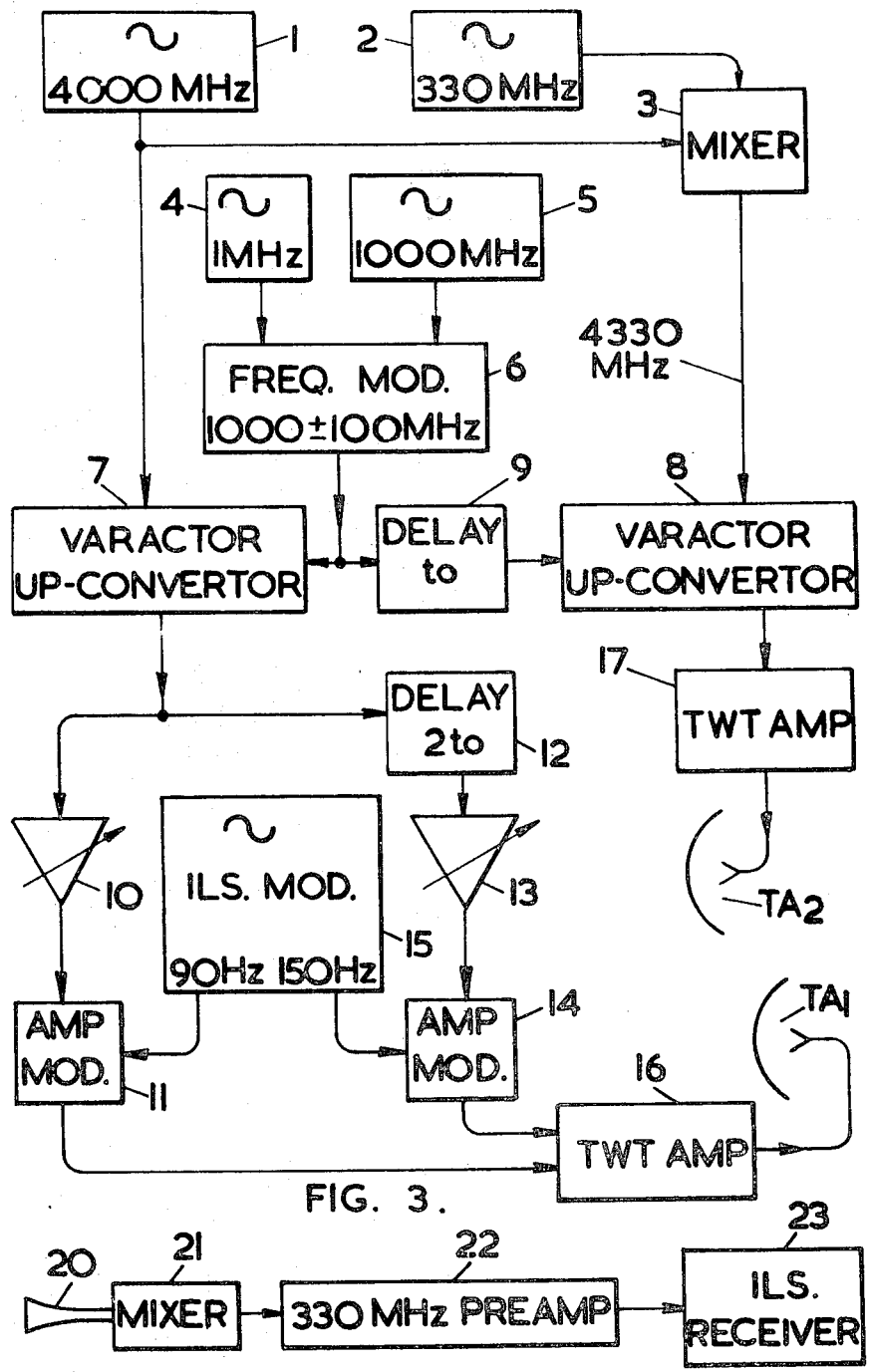
Figure 5:
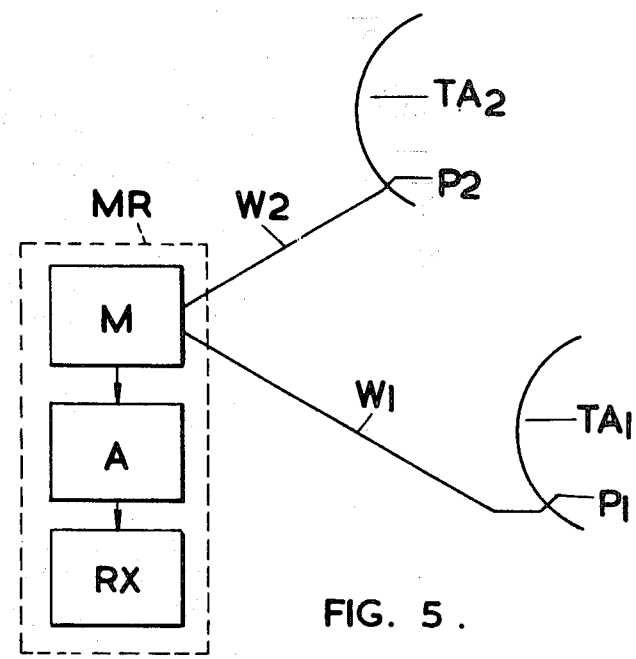
Figure 6:
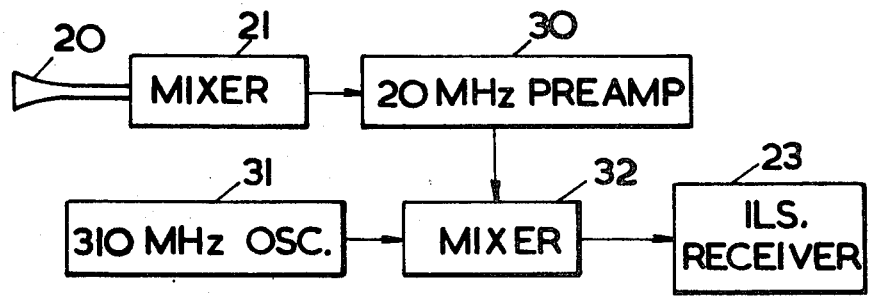
Figure 7:
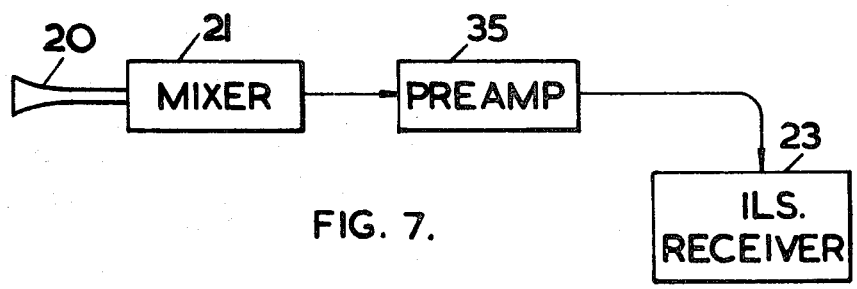

An embodiment of the invention will now be described, with reference to the accompanying drawings, of which FIG. 1 is a diagrammatic perspective drawing, and FIG. 2 is a diagrammatic elevation both indicating the disposition of glide path transmitter aerials, FIG. 3 is a schematic circuit diagram of the transmitter apparatus FIG. 4 is a schematic circuit diagram of a receiver for use with the transmitter of FIG. 3, FIG. 5 is a schematic circuit diagram of monitoring apparatus for use with the transmitter of FIG. 3, and FIGS. 6 and 7 are schematic circuit diagrams of alternative forms of receiver, for use with modified forms of the transmitter.

FIG. 1 shows, diagrammatically and not to scale, two transmitter aerials $TA_1$ and $TA_2$, each comprising a feed horn and a parabolic cylindrical reflector, both mounted on a mast at a safe distance D to one side of the center line of an airfield runway R. The aerial $TA_1$ is mounted near the base of the mast, and the aerial $TA_2$ is mounted a distance $2d$ above the aerial $TA_1$. FIG. 2 represents a section taken parallel to the runway R, in which the line L represents ground level and the broken line GP represents the preferred glide path for aircraft approaching to land on the runway R of FIG. 1. The transmitter aerials $TA_1$ and $TA_2$ are preferably arranged so that the glide path GP is the perpendicular bisector of a line joining the centers of the aerials. The glide path GP will generally be inclined at about 3° to the horizontal. Typical values for the distances D and $2d$ might be 500 feet and 30 feet respectively.

FIG. 3 shows a schematic circuit diagram of transmitter apparatus which is connected to the aerials $TA_1$ and $TA_2$, comprising signal generators 1 and 2 connected to supply signals at 4,000 MHz and 330 MHz respectively to a mixer 3. Two more signal generators 4 and 5 are connected to supply signals at 1 MHz and 1,000 MHz to a frequency modulator 6. A varactor up-convertor circuit 7 is connected to receive signals directly from the outputs of the generator 1 and the frequency modulator 6. Another varactor up-convertor circuit 8 is connected to receive signals directly from the output of the mixer 3, and via a delay unit 9 from the output of the frequency modulator 6. The output of the varactor up-convertor circuit 7 is connected via an amplitude control amplifier 10 to an amplitude modulator 11, and is also connected via a delay unit 12 and another amplitude control amplifier 13 to an amplitude modulator 14. An ILS modulation generator 15 is connected to feed 90 Hz signals to the modulation input of the modulator 11 and 150 Hz signals to the modulation input of the modulator 14. The outputs of the modulators 11 and 14 are connected to a travelling-wave-tube amplifier 16, and the output of the varactor up-convertor circuit 8 is connected to another travelling-wave-tube (t–w–t) amplifier 17. The output of the t–w–t amplifier 16 is connected to the feed horn of the lower transmitter aerial $TA_1$, while the output of the t–w–t amplifier 17 is connected to the feed horn of the upper transmitter aerial $TA_2$.

In the operation of the transmitter, the frequency modulator 6 will produce frequency-modulated signals varying about a center frequency of 1,000 MHz with a frequency deviation of ± 100 MHz, the deviation being controlled by the 1 MHz signal from the generator 4. The frequency-modulated output of the modulator 6 is combined in the varactor up-converter circuit 7 with the 4,000 MHz signal output from the generator 1 to produce a frequency-modulated output varying about a center frequency of 5,000 MHz. This signal at 5,000 ± 100 MHz is amplitude modulated with a modulation frequency of 90 Hz in the amplitude modulator 11 and with a modulation frequency of 150 Hz in the amplitude modulator 14, but because of the delay unit 12 the signal modulated at 150 Hz is delayed by $2to$ relative to the signal modulated at 90 Hz. The two amplitude modulated signals thus produced are combined in the amplifier 16 and radiated from the aerial $TA_1$.

Meanwhile, the varactor up-convertor 8 receives a signal at 4,330 MHz from the mixer 3 and combines it with a delayed version of the frequency-modulated output of the modulator 6, producing a frequency-modulated output varying about a center frequency of 5,330 MHz which is amplified by the amplifier 17 and radiated from the upper aerial $TA_2$.

FIG. 4 shows schematically the arrangement of receiver apparatus for installation in an aircraft for receiving landing guidance signals from the transmitters of FIGS. 1, 2 and 3. It comprises a microwave aerial, which is preferably a horn 20, a mixer unit 21, a preamplifier 22 and a conventional ILS glide path signal receiver circuit 23. When installed and operating in an aircraft approaching the glide path transmitter installation, the horn aerial 20 will receive $f–m$ signals at 5,330 ± 100 MHz from the aerial $TA_2$ and $f–m$ signals at 5,000 ± 100 MHz from the aerial $TA_1$, the latter signals carrying modulation at 90 Hz and 150 Hz. These $f–m$ signals interact in the mixer 21 to produce correlation product signals having a frequency of 330 MHz carrying the 90 Hz and 150 Hz modulations. These signals resemble the glide path signals of a conventional ILS system in that the relationship between the amplitudes of the 90 Hz and 150 Hz modulations is a function of the displacement of the receiver from the preferred glidepath GP, and after amplification in the preamplifier 22 they are applied as inputs to a conventional ILS glide path guidance receiver to give an indication of the aircraft's position relative to the preferred glide path.

The transmitter circuit (FIG. 3) is constructed so that if the delay units 9 and 12 introduced zero delays, all the signal paths from the output of the modulator 6 to either of the transmitter aerials are of equal electrical length; that is to say they would delay their signals by equal amounts, if the delays of $t_0$ and $2t_0$ were not caused by the delay units 9 and 12 respectively. If this balance is not quite achieved, compensating adjustments may be made by adjusting the delay times of the units 9 and 12. The delay time $2t_0$ of the unit 12 and the separation of the aerials determines the sensitivity of the displacement indications provided by the system, while the relative value of the delay time $t_0$ of the delay unit 9 determines the inclination of the locus of points at which the 90 Hz and 150 Hz modulations are received with equal amplitudes (that is the locus of zero difference in depths of modulation of the 90 Hz and 150 Hz modulations). This locus should lie on the preferred glide path; preferably the delay time $t_0$ of the unit 9 is exactly half the delay time $2t_0$ of the unit 12, which will make the locus lie on the perpendicular bisector of a line joining the centers of the two aerials.

Appropriate values of the time delays $t_0$ and $2t_0$ required to achieve a desired sensitivity depend on the separation $2d$ of the transmitter aerials and the bandwidth and spectral distribution of the modulation waveform. When the frequency modulation is controlled by a pure sine wave, the preferred sensitivity for a conventional 3° glide path approach will be achieved by making $$t_0 = \frac{4 \times 10^5}{(2d)^{0.7}(\Delta f)^{1.7}}.$$

where $\Delta f$ is the maximum deviation of the frequency-modulated waveform, and the aerial separation $2d$ is expressed in meters. In the present embodiment, $2d$ is 9.15 meters and $\Delta f$ is $10^8$ (that is 100 MHz), and the preferred value for $2t_0$ is about 5 nanoseconds. Other suitable combinations can be derived by changing both $2t_0$ and $2d$ in inverse proportion to any change made in the bandwidth of the modulation waveform. The equation given hereinabove is only an approximation valid only for a range of typical embodiments including the specific example herein described. A fuller and more accurate presentation of the relationships between the various parameters involved in these and other possible embodiments of the invention may be found in Royal Aircraft Establishment Technical Report No. 68280.

It is obviously very desirable, for the sake of safety, to monitor the accuracy of all landing guidance signals. Effective monitoring is not easy in the case of conventional ILS systems, because their guidance depends on the directional properties of the aerials used and can only be checked at points some considerable distance in front of the aerials; moreover it is clearly impractical to mount any monitoring probes on or close to the desired glide path.

It is an advantage of correlation-signal guidance systems, including systems as described in the aforementioned U.S. Pat. No. 3,404,402 as well as the systems herein described, that they allow the accuracy of the guidance provided to be effectively monitored by apparatus permanently installed at fixed positions near the transmitter aerials.

This advantage is achieved because, in the case of the correlation-signal forms of guidance system, the guidance depends on the phase-delays applied to the modulation signals in the transmitter and on the difference in the times of transit to the receiver of signals from the two aerials. The times of transit are not critically affected by propagation conditions or aerial alignment, being substantially fixed functions of the receiver position. It is therefore only necessary to monitor the signals propagated from each aerial close to the aerials, and this may conveniently be done by providing a probe mounted on the reflector of each aerial and connecting the probes by waveguides of equal electrical length to a receiver apparatus.

FIG. 5 shows suitable monitoring apparatus comprising probes P1 and P2 mounted on the reflectors of the aerials TA$_1$ and TA$_2$ respectively, and waveguides W$_1$ and W2 connecting the probes P$_1$ and P2 respectively to the mixer M of a monitor receiver MR which also comprises a preamplifier A and a conventional ILS receiver RX.

When the transmitter apparatus is working, the probes P$_1$ and P2 pickup samples of the signals propagated, and transmit them through the waveguides W$_1$ and W2 respectively to the monitor receiver MR. The monitor receiver MR acts on these signals exactly as the receiver of FIG. 4 acts on the signals it receives, as hereinbefore described. If the waveguides W$_1$ and W2 are of exactly equal electrical length, and the transmitter is operating correctly, the receiver RX should indicate zero difference of depth of modulation and in effect it should always show the same indication as a receiver in an aircraft correctly positioned on the glide path. If the waveguide paths via W$_1$ and W2 are then made of slightly unequal lengths, for instance by switching a given delay line in series with one of them, this should produce a calculable difference-in-depth of modulation indication on the receiver RX, which can be used as a check of the sensitivity of the guidance signals.

It should be clearly understood that the embodiment hereinbefore described has been described by-way-of example only, as many variations and modifications thereof will now be obvious to persons skilled in the art. For instance the center carrier frequencies of the transmitted signals need not necessarily be 5,000 MHz and 5,330 MHz, although they should be microwave frequencies in a waveband internationally allocated for aircraft navigational aids, and their difference should preferably be one of the frequencies conventionally used for glide path guidance so that a standard ILS receiver may be used as hereinbefore described. The signal controlling the deviation of the frequency-modulated waveform need not be a 1 MHz sine wave, but could be any signal not containing frequencies less than the bandwidth of the glide path section of the ILS receiver. For instance it might be advantageous to replace the oscillator 4 with a noise source connected to the modulator 6 through a high-pass filter which obstructs all frequencies lower than 300 kHz. Lower frequency modulations should be avoided to ensure that the ILS receiver (e.g., 23 in FIG. 4) will not respond to the modulation sidebands but only to their cross-correlation products. Another improvement may comprise the connection of signal-amplitude stabilizing arrangements to control the gains of the amplifiers 10 and 13.

Carrier frequencies considerably less than 330 MHz apart may be used so that the guidance signals may be contained within a narrower waveband. For instance, the signal generator 2 of FIG. 1 may be constructed to provide signals at 20 MHz instead of 330 MHz, making the transmitted carrier frequencies 5,000 MHz and 5,020 MHz. The receiver apparatus must then be correspondingly modified, for instance to a form as shown in FIG. 6.

FIG. 6 shows a modified receiver, comprising a horn 20 and a mixer 21 as in the receiver of FIG. 4, but now feeding a 20 MHz preamplifier 30. A local oscillator 31 and a mixer circuit 32 are provided to change the frequency of the preamplifier output into one of the normal glide path frequencies acceptable to a standard ILS receiver 23.

Alternatively, the signal generator 2 of the transmitter (FIG. 1) may be constructed to provide signals at one of the intermediate frequencies of a conventional ILS receiver, the receiver apparatus being modified to the form shown in FIG. 7. This comprises a horn aerial 20 and mixer 21 as in FIG. 4 and FIG. 6, feeding a preamplifier 35 which is tuned to the chosen intermediate frequency. The preamplifier output is then connected to a suitable intermediate-frequency stage of a conventional ILS receiver 23.

The delay *to* of the unit 9 need not be exactly half the delay 2*to* of the unit 12; making *to* greater than half 2*to* makes the equisignal locus (the guidance path) hyperbolic and moves it nearer to the aerial which transmits the signal delayed by *to*.

We claim:

1. Transmitter apparatus for an instrument landing system, comprising a first transmitter aerial and a second transmitter aerial, signal generator means for generating at least three distinct but related frequency-modulated signals, means connected to the said first transmitter aerial and to said signal generator means for generating a first carrier signal carrying as modulation a first one of the said frequency-modulated signals, means connected to the said second transmitter aerial and to said signal generator means for generating a second carrier signal carrying as modulation a second one and a third one of the said frequency-modulated signals, the timing and form of said frequency-modulated signals being such that on reception they yield at least two distinguishable cross correlation products which are equal in amplitude when the signals are received on a desired guidance path and vary differentially in amplitude with respect to one another as the point of reception moves from one side to the other of the desired guidance path.

2. Transmitter apparatus as claimed in claim 1, wherein the carrier frequency of the said first carrier signal differs from the carrier frequency of the said second carrier signal by an amount in the range from 328 MHz to 335 MHz.

3. Transmitter apparatus as claimed in claim 1, comprising a first monitor input mounted adjacent to the first aerial, a second monitor input mounted adjacent to the second aerial, and a monitor receiver means connected to the first monitor input and to the second monitor input, for monitoring cross-correlation products formed by heterodyning signals propagated by the first aerial with signals propagated by the second aerial.

4. Transmitter apparatus as claimed in claim 3, wherein the said monitor receiver comprises means for applying a selectable relative time delay to the said signals before heterodyning them.

5. Transmitter apparatus as claimed in claim 1, wherein the signal generator means comprises means for generating a frequency-modulated waveform, and deriving from the said waveform a first signal comprising the said waveform delayed by a first predetermined time delay, a second signal comprising the said waveform amplitude-modulated by a first audiofrequency, and a third signal comprising the said waveform delayed by a second predetermined time delay and also amplitude-modulated by a second audiofrequency, the said first, second and third signals thereby forming the said first, second and third ones of the said frequency-modulated signals.

6. Transmitter apparatus as claimed in claim 5, wherein the carrier frequency of the said first carrier signal differs from the carrier frequency of the said second carrier signal by an amount in the range from 328 MHz to 335 MHz.

7. Transmitter apparatus as claimed in claim 5, comprising a first monitor input mounted adjacent to the first aerial, a second monitor input mounted adjacent to the second aerial, and a monitor receiver means connected to the first monitor input and to the second monitor input, for monitoring cross-correlation products formed by heterodyning signals propagated by the first aerial with signals propagated by the second aerial.

8. Transmitter apparatus as claimed in claim 7, wherein the said monitor receiver comprises means for applying a selectable relative time delay to the said signals before heterodyning them.

* * * * *